United States Patent Office.

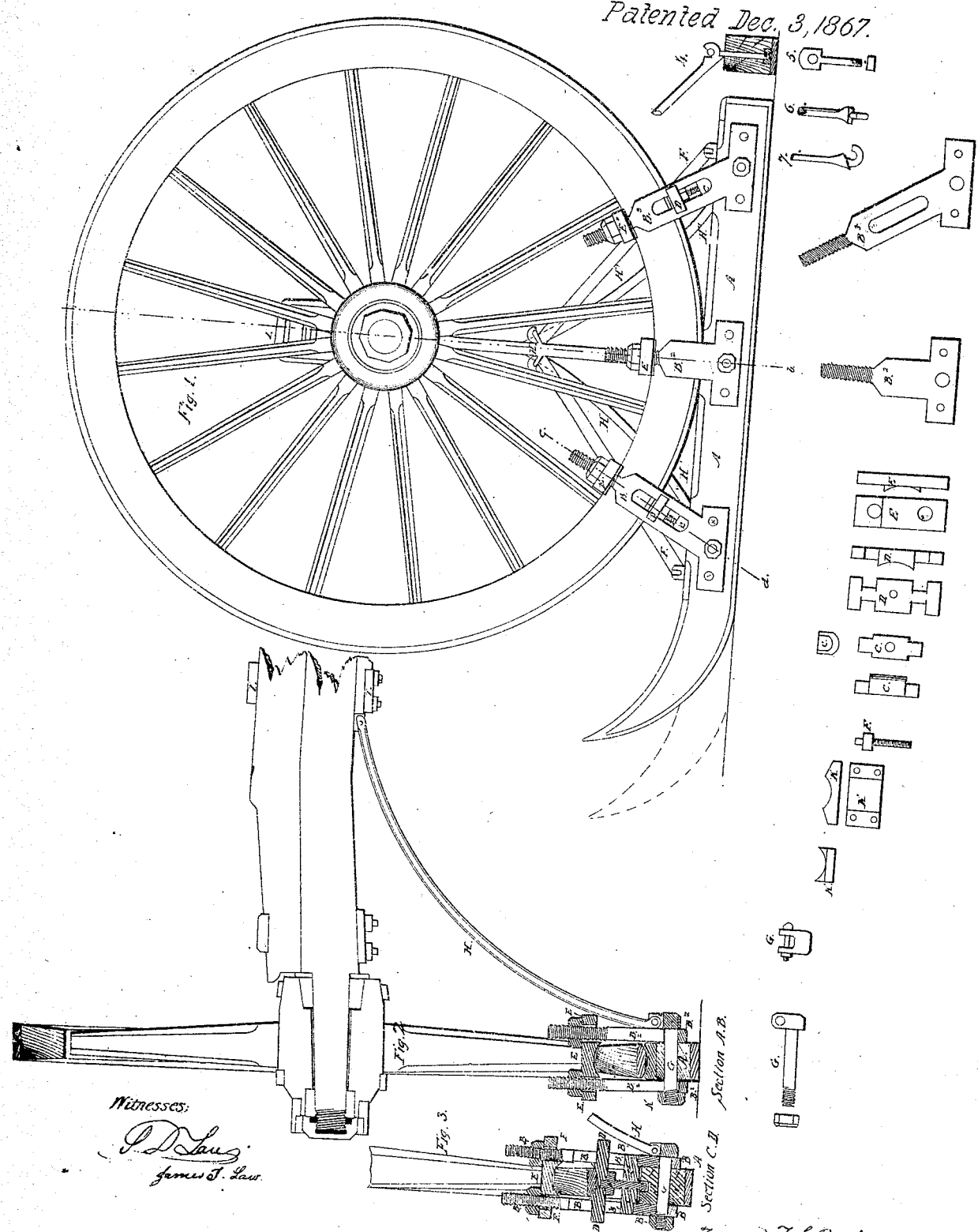

FERDINAND T. L. BOYLE, OF NEW YORK, N. Y.

Letters Patent No. 71,576, dated December 3, 1867.

---

IMPROVEMENT IN RUNNER FOR WHEELED VEHICLES.

---

The Schedule referred to in these Letters Patent and making part of the same.

---

TO ALL WHOM IT MAY CONCERN:

Be it known that I, FERDINAND T. L. BOYLE, of the city of New York, in the county of New York, and State of New York, have invented a new and improved Runner for Wheeled Vehicles, which is adjustable or capable of being attached to or detached from such vehicles at pleasure; and I do hereby declare that the following is a full, clear, and exact description thereof, and of its mode or manner of operation, reference being had to the accompanying drawings and to the letters of reference marked thereon, and making a part of this specification.

My invention consists in such a construction and arrangement of sleigh-runners, that they can be easily and securely attached to the wheel of a carriage or wagon without removing any part of such carriage or wagon, and by which any such wheeled vehicle can be quickly converted into a sleigh, and so that such runners can be detached when necessary or desired, and the vehicle be again changed from a sleigh to one running on wheels.

It is very desirable, as a matter of convenience and economy, to be able to convert a wheeled vehicle into a sleigh, and *vice versa*, so that the same vehicle can be used both as a summer and a winter conveyance. It has been endeavored to accomplish this in various ways, but in all, so far as I am aware, it has been necessary to remove some portion of the wheeled vehicle in order to attach the runners. I obviate such necessity by my invention.

It also often happens, by reason of sudden changes in the weather, as by the fall of heavy bodies of snow, or by the sudden melting of the snow, from heavy rains or other cause, that wheeled vehicles or sleighs are rendered wholly unfit for use, and further progress with them is arrested until a change of vehicle can be effected. Under the most favorable circumstances, such change can be effected only at much inconvenience and expense, and frequently cannot be effected at all; and the hindrance and delay created thereby, not only cause much pecuniary loss, but in many cases, as in the transportation trains of armies, and under circumstances of similar necessity, produce great distress and suffering, if not more serious evils.

The use and application of my invention render it possible and easy to convert, in a very short time, any wheeled vehicle, without removing its wheels, or changing any of its parts, or removing or displacing its load, into a sleigh fitted for use as such, and again to convert such sleigh, at any time required, into a wheeled vehicle ready for use. The several parts or pieces necessary to effect such changes are also so few and compact in form, that they can be conveniently carried along with any carriage or wagon, and thus be at hand ready for application and use, as emergencies may arise and render them necessary.

The drawings show my invention as applied to a light carriage, and also to a heavy road or transport-wagon.

Plate I shows a wheel of a light carriage with a runner attached thereto, and also detached views of different parts of the connections, and a reduced representation of a carriage converted into a sleigh.

Plate II shows a wheel of a transport-wagon having a runner fixed thereto, and showing also detached views of parts of the connections.

I will first describe the application of my invention to a light carriage, and then as applied to a transport-wagon.

The runner A is made substantially like those used in ordinary sleighs, and is to be shod in any suitable manner, and the width of such runner will correspond substantially with that of the wheel under which is to be placed. To such runner are fixed a clamp and two braces, $g$ $g$, the clamp being placed about midway of the horizontal part of the runner, and perpendicularly under the centre of the wheel or its axle, and the braces, called the front and rear or toe and heel braces, generally at an angle of about forty degrees with the centre one. By means of such clamps and braces, the wheel and runner are firmly secured to each other, so as to allow of no motion of the one upon the other. To the upper side of the runner, at the place of location of the clamp above mentioned, is fixed a bed-plate, K, which takes the wheel, having its upper surface formed as shown in Figure 3, by the intersection of two grooves, each having a greater curve than the section of the tire or circumference of the wheel, so as to give to any wheel which may stand upon it, four points of contact, and thereby prevent any motion of the wheel on such bed-plate either forwards or sideways. Such construction of bed-plate also assists in more securely and tightly connecting the wheel and runner together. To the runner on each side of such bed-plate, is fixed a staple, $a$, for taking the links $b\ b$, through which passes the strap $c$, by tightening which the wheel is brought closely against the bed-plate and securely connected to the runner. The links $b\ b$ are best made triangular, as shown in Figures 1, and 12, and 13, Plate I, with the upper side that receives the strap, bent so as to form a sort of recess for the strap, to guard it from being chafed, &c. Such links are also long enough to reach and partially embrace the felloe of the wheel, so as to act as braces against side thrust. The strap $c$ is of stout leather or of any strong material, and is tautened or strained so as to cause the wheel or tire to bite into the bed-plate. The wheel and runner are thus easily and securely connected together. Figure 2, Plate I, is a section of the runner and wheel thus connected.

Figures 4 and 5, plate I, show an arrangement of clamp, in which the links, staples, and strap before described are dispensed with, and a flexible chain and screw used in place thereof. In such case, the bed-plate, instead of being fixed to the runner, as shown in fig. 2, is constructed as shown in Figures 3, 4 and 5, so as to allow a chain, $d$, to pass under the centre portion. Such chain is then brought up upon each side of the felloe, and hooks over the ends of the cross-bar $e$, through which passes the screw $f$, turning upon the plate $f'$. As such screw is turned, the cross-bar is raised, and the felloe or wheel drawn with great power against the bed-plate and runner. I prefer this arrangement of clamp to the one first described, as it is neater in appearance, and dispenses with the use of straps, which are liable to stretch more or less. The toe and heel clamps and braces $g\ g$ are placed each side of the central clamp, distant therefrom about half the length of the radii of the wheel, and at about an angle of forty degrees from the centre of the wheel, or so as to form with the runner parts of the two other sides of a triangle, substantially equilateral, or not greatly varying therefrom, thus giving great strength and firmness to the combined structure, and rendering it capable of withstanding great strain, and so that the power or force applied to draw forward or push backward the vehicle, will act against or substantially in the line of such front and back braces, thereby acting more effectually. These consist of stiff braces $g\ g$, which are firmly fixed or secured at one end to the top of the runner, and are of such a length as to reach and brace against the wheel, substantially as shown in fig. 1, Plate I. To the upper end of each of such braces is fixed a bed-plate to take the wheel, which may be shaped and will take the wheel substantially like the bed-plate before described. These braces may be secured to and against the upper side of the runner by means of a strap-link, $h$, and staple $h'$, as shown at the back end of the runner in fig. 1, and also in Figure 14, or by a staple and eye, as shown in Figure 6, and at the front end of the runner in fig. 1. The strap $j$ brings the wheel and bed-plate continually close against each other, and the strap $k$ prevents the brace $g$ in any manner being moved outward away from the wheel so as to cease supporting it.

Figures 6 and 7 are sections through such toe and heel braces.

Figures 8 to 14 are detached and enlarged representations of the several parts.

Figure 17 shows another method of securing the brace $g$, by which the straps $j$ and $k$ may be dispensed with. The upper end of the brace $g$ may have a bed-plate like $k$, or an iron stirrup extending upon each side of the tire. Such brace is drawn close to and held against the wheel by the iron brace-rod $o$, in which is a screw-swivel, by which the brace can be forced against the wheel with great power and securely held there.

Figure 18 shows another construction and arrangement of toe or heel brace, a side view of which is shown in Figure 19. Such brace $g$ may be wholly of metal, and can thus have all required strength, with graceful proportions, and is attached to the runner by means of an eye or stud, $h'$, which passes through the runner, and is secured thereto by a nut, as seen in fig. 19, and connects with such eye or stud $h'$ by a hinge-joint, so that its upper end can move freely backwards and forwards, thus enabling such brace to adapt itself to wheels of all sizes. Through a hole in the upper end of such brace passes a brace-rod, $j'$, which fastens to the runner at points both before and behind the eye $h'$, thus giving increased strength to the brace $g$, and also strengthening the runner itself, and guarding it from fracture between its centre and extremities. The brace $g$ is held in any desired position on the brace-rod $j'$ by means of the side screw $x$. Such arrangement of brace and brace-rod also so fills up or occupies the open space between the wheel and runner, as to give a more artistic appearance to the vehicle. The upper end of such brace embraces each side of the wheel, and is securely and tightly confined to it by means of chains and a clamp, as in fig. 5. This arrangement of brace I consider preferable to either of the forms before described.

To prevent or guard against any side thrust or strain that the runner may at any time receive, an iron brace, $l$, extends from the runner, at or near the centre connection between the wheel and runner, to the axle of the carriage, to which it is fixed in any convenient and sufficient manner. From such main brace $l$, side braces $m\ m$ extend backwards and forwards, and connect with the runner near the toe and heel braces. In fig. 1, of Plate I, such main and side braces are shown rigidly fixed together. The detached Figures 15 and 16 show, however, these braces so connecting together, that they can when detached from the runner and axle be folded closely against each other for convenience of transportation and storage. Figures 4, 6, 7, Plate II, show a method of forming the ends of such braces with a hook and shoulder, so as to easily be inserted in a permanent eye, fig. 5, in the runner, and when so hooked to rest against such eye as a bracing-point. The same arrangement of construction can also be applied to the upper ends of the side braces, and their connection with the main brace, as shown in fig. 1, Plate I.

The wheel of the carriage being slightly raised, and the runner placed thereunder in proper position, the clamps and braces are fixed and secured to the wheel, all of which can be done in a very little time, and the carriage is converted, without the displacement or removal of any of its parts, into a sleigh ready for use.

Plate II shows a construction of runner, and clamp, and braces adapted for a heavy transport-wagon. The runner A is made heavy to correspond with the wagon, and has fixed to it three braces and clamps, as in the former case described. Such braces, however, will require to be stronger than for lighter vehicles, and may, perhaps, best and cheapest be made substantially as shown in fig. 1, as they can be made of iron, malleable or wrought, and can be easily attached to or detached from the wheel, and also the runner. With each clamp is used a bed-plate, which may be constructed in the form hereinbefore described, or may have a single curve, as shown at k, Plate II. The braces or clamps B are bolted to each side of the runner, and are reduced in size at the top so as to have a screw-thread cut upon them to take a nut. A clamp or cross-piece, E, which may be made slightly concave on its under side, as shown in fig. 2, so as to hug closer the felloe, passes across and over the felloe, and is brought down tight upon it by the nuts on the ends of the braces B, and thus secures the wheel to the bed-plate and runner. The toe and heel clamps are fixed to the runners in substantially the same manner as the centre one, and clamps or cross-pieces E′ E″ confine the wheel thereto, as before described. The bed-plates in the toe and heel clamps are made movable or adjustable, so as to be adapted to wheels of different diameters. This is accomplished by having the bed-plate or bolster D supported on a screw, F, which passes into and rests in the bed-piece C, and by turning which the bolster and bed-plate D may be lowered or raised, as required. Fig. 3 is a sectional view through the toe clamp, showing the construction of the several parts, and their permitted motion upon each other.

A strong brace, H, extends from the runner, near the centre clamp B², to the axle, and is fastened thereto by a clamp or band, I. Side braces H′ H′, extend from the runner, connecting therewith near the toe and heel braces, and uniting to the main brace H near or at the axle. Such braces may be secured to the runners in the manner shown in figs. 2 and 3, or by a hook and eye, as illustated in figs 4, 5, 6, and 7.

What I claim as my invention, and desire to secure by Letters Patent, is—

1. Connecting a runner to the wheel of any vehicle by means of a central clamp or fastening, embracing the bottom of the wheel, and perpendicular under the centre of the wheel or its axle, and of a front and rear brace located substantially as described, extending from the runner to the wheel, and inclined inwards toward the axle, substantially as and for the purposes set forth.

2. In combination with such a runner so constructed, the arrangement of the flexible chain $d$ and tightening-screw $f$, and of the movable braces $g\,g$ and brace-rod $o$, either separately or in combination, for binding and holding the wheel securely to the runner, for the puposes set forth.

3. In combination with such runner, the construction and arrangement of the hinged brace $g$, and brace-rod $j'$, and chain clamps, as shown in figs. 18 and 19, substantially as and for the purposes set forth.

4. In combination with such a runner, the arrangement of the fixed clamps and braces B B¹ B², Plate II, and the cross-pieces E, for securing the wheel and runner together.

5. In combination with such a runner, the arrangement of the adjustable bed-plate or bolster D, or its equivalent, to adapt the length of the front and rear braces to wheels of different diameters, for the purposes set forth.

6. The construction of the bed-plate K for taking the wheel, having a surface formed with a single concave, or by the intersection of two concaves, as described, so as to secure two or more distinct and independent points of bearing or contact for the wheels, for the purposes set forth.

7. In combination with such a runner, the use and arrangement of the braces $l\,m\,m'$, for connecting the runner and axle, to protect the runner against side thrust or strain.

8. Forming the side braces $m\,m'$ or H′ H′, with a hook and shoulder at either or both ends, substantially as shown in figs. 4, 6, 7, Plate II, for the purposes set forth.

FERDINAND T. L. BOYLE.

Witnesses:
S. D. LAW,
JAMES T. LAW.